United States Patent Office 3,740,322
Patented June 19, 1973

3,740,322
RECOVERY OF DITRIMETHYLOLPROPANE BY VACUUM DISTILLATION AND RECRYSTALLIZATION
Yasuo Wada, Ikeda, and Katsumi Ishihara, Hirakata, Japan, assignors to Koei Chemical Co., Ltd., Osaka, Japan
No Drawing. Filed Nov. 17, 1970, Ser. No. 90,424
Claims priority, application Japan, Nov. 29, 1969, 44/96,118
Int. Cl. C07c 41/12; B01d 3/10
U.S. Cl. 203—48        3 Claims

ABSTRACT OF THE DISCLOSURE

The present invention relates to a process for recovering ditrimethylolpropane from the bottom residue obtained in the production of trimethylolpropane from n-butyraldehyde and formaldehyde in the presence of an alkaline catalyst, which process involves subjecting the bottom residue remaining after vacuum distilling the trimethylolpropane from the resulting reaction mixture to steam distillation with superheated steam under a reduced pressure to obtain a distillate containing ditrimethylolpropane. The optimum temperatures for carrying out such a distillation are 160–220° C., and the preferred pressure range is 30–100 mm. Hg.

---

This invention relates to a method for recoverying ditrimethylolpropane formed as a by-product in the production of trimethylolpropane by reacting n-butyraldehyde with formaldehyde in an aqueous medium in the presence of an alkaline catalyst.

It is well known to produce trimethylolpropane by the reaction, in an aqueous medium, of n-butyraldehyde with formaldehyde in the presence of an alkaline catalyst, for example, hydroxide of alkali metal or alkaline earth metal. This reaction may be represented as follows:

$$CH_3CH_2CH_2CHO + 3CH_2O + MOH \longrightarrow$$

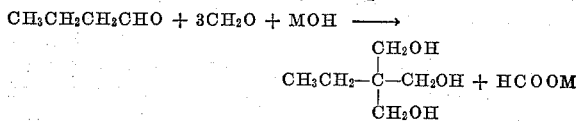

wherein M represents an alkali metal or alkaline earth metal. This method is very well known in the art and there are many patents (e.g. U.S. Pat. No. 3,097,245) and literatures dealing therewith, so that it would be not necessary to make a detailed explanation thereabout.

It is also known that ditrimethylolpropane is also formed as a by-product in the above production of trimethylolpropane. In this connection, reference may be made for example to U.S. Pat. No. 3,097,245.

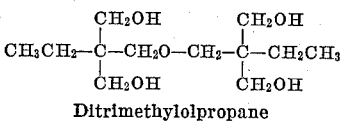

Ditrimethylolpropane

Ditrimethylolpropane is useful as a material for the manufacture of alkyd resins, plasticizers, lubricants, etc. and therefore it would be industrially significant if ditrimethylolpropane formed as a by-product in the production of trimethylolpropane as mentioned above can be readily and effectively recovered. However, there has been no report teaching or suggesting such recovery of ditrimethylolpropane.

Therefore, it is an object of this invention to provide a method of recovering ditrimethylolpropane formed as a by-product in the production of trimethylolpropane.

Another object of this invention is to provide a method for purifying ditrimethylolpropane so recovered.

Other objects of this invention will become apparent from the following description.

In the industrial production of trimethylolpropane, n-butyraldehyde is reacted with formaldehyde in an aqueous solution in the presence of an alkaline catalyst (typically lime or sodium hydroxide). After the reaction, trimethylolpropane is separated from the reaction mixture by a known convenient method. Thus, for example, the reaction mixture, after being concentrated or not concentrated, is subjected to extraction with a solvent, e.g. ethylacetate, amyl alcohol methylisobutylketone, hexyl alcohol, isooctyl alcohol, cyclohexanol, etc. By this method there is obtained a solution of trimethylolpropane substantially free from formate. Alternatively, water is substantially removed from the reaction mixture and the concentrate is filtered while hot to separate formate from crude trimethylolpropane. In any case, the crude trimethylolpropane or its solution thus obtained is purified by vacuum distillation. The above mentioned separation and subsequent purification of trimethylolpropane is also well known per se in the art so that no further explanation would be necessary.

This invention starts from the bottom residue remaining after the said vacuum distillation. In this bottom residue there are contained ditrimethylolpropane, in addition to various by-products which are non-crystalline at room temperature, as well as formate. It is different, however, to effectively and economically recover ditrimethylolpropane from such bottom residue. Thus, for example, it is possible to recover ditrimethylolpropane from the residue by conducting the recrystallization with the use of water or a proper organic solvent such as acetone. In this method, however, repeated recrystallization is required to obtain a product with sufficient purity required as industrial material. Ditrimethylolpropane can also be recovered by treating the bottom residue with acetic anhydride to acetylate ditrimethylolpropane and then isolating the acetylated product by vacuum distillation, followed by decomposition with alkali to ditrimethylolpropane. This method is troublesome and is industrially not practical. The bottom residue itself or the same after removal of the major part of the remaining formate by a suitable method may be subjected to vacuum distillation to recover ditrimethylolpropane. However ditrimethylolpropane has a very high boiling point and therefore there occurs the thermal decomposition of ditrimethylolpropane during the distillation.

We have unexpectedly found that when the bottom residue containing ditrimethylolpropane is subjected to steam distillation with superheated steam under reduced pressure ditrimethylolpropane can be readily and effectively recovered in the form of its aqueous solution without causing any noticeable decomposition of ditrimethylolpropane. Upon removal of water from the aqueous solution thus obtained there is recovered ditrimethylolpropane which has purity sufficiently high for the use as an industrial material. If pure ditrimethylolpropane is desired, the above recovered ditrimethylolpropane may be repeatedly recrystallized from water or a proper organic solvent such as acetone. Alternatively, the aqueous solution of ditrimethylolpropane obtained by the superheated steam distillation under reduced pressure may be concentrated and cooled to crystallize ditrimethylolpropane, which may be subjected to repeated recrystallization from water or a proper organic solvent such as acetone.

In carrying out the method of this invention it is preferable to employ steam heated to a temperature within the range from 160 to 220° C. The steam distillation with such superheated steam should be conducted under a reduced pressure according to this invention. Preferable pressure is 30–100 mm. Hg. Through other pressure outside the above range may, of course, be used for the vacuum distillation, the use of a higher vacuum will cause difficulty in collecting the distillate, while a lower vacuum will bring the concentration of ditrimethylolpropane in the distillate less dense, which is not economical. The suitable temperature inside the distillation still is from 170 to 220° C. When heated above 220° C., ditrimethylolpropane would be decomposed due to the presence of formate, while at a temperature below 170° C., the concentration of ditrimethylolpropane in the distillate becomes more dilute. The most preferable conditions inside the distillation pot would be 180–200° C. under a reduced pressure of from 50 to 80 mm. Hg. By the vacuum distillation with such superheated steam, there is obtained an aqueous solution of ditrimethylolpropane, which can be isolated simply by distilling water away. Alternatively, the aqueous solution may be concentrated and cooled to crystallize ditrimethylolproane. Ditrimethylolpropane thus obtained has a purity sufficient for use as a material in the manufacture of alkyd resins, plasticizers, lubricants, etc. If desired ditrimethylolpropane may further be purified by recrystallization as explained hereinbefore.

The following examples illustrate the present invention.

EXAMPLE 1

Two hundred and sixteen grams of n-butyraldehyde and 300 grams of 48% aqueous solution of caustic soda were added dropwise simultaneously and gradually to 2970 grams of 10% aqueous solution of formaldehyde, with thorough stirring. The reaction temperature was maintained at 35° C. by external cooling. The time required for the addition of the n-butyraldehyde was two hours and that required for the aqueous solution of caustic soda was one hour and 45 minutes. After further stirring at 35° C. for four hours, the temperature was made to rise, and was maintained at 70° C. for three hours. After neutralizing to pH 6.8 with the addition of formic acid, the solution was concentrated under reduced pressure until it has a specific gravity of 1.244 (at 25° C.), and was extracted with 1.560 grams of butyl acetate in four portions. The extracts were combined and all butyl acetate was recovered by distillation under reduced pressure. Then, 352.5 grams of trimethylolpropane were obtained by distilling the residue at 135–140° C. under a reduced pressure of 1.5 mm. Hg. By this procedure, there remained 39 g. of bottom residue in the still pot. The pot was then heated at 180° C. and superheated steam (200° C.) was introduced therein, while maintaining a vacuum of 50 mm. Hg in the system. After one hour, 220 grams of distillate were obtained. After evaporating water from this distillate, there were obtained 15 g. of product (M.P. 98–105° C.) of a considerable purity. This product was recrystallized from 50 cc. of acetone. The recrystallization was repeated three times to obtain pure ditrimethylolpropane (10 g.) having a melting point of 108–109° C.

EXAMPLE 2

Thirty nine grams of the bottom residue obtained as in Example 1 were heated to 200° C. and superheated steam (200° C.) was introduced therein for 1 hour while maintaining a reduced pressure of 40 mm. Hg to obtain 160 grams of distillate. The distillate, after having been distilled to evaporate water and concentrated to 50 grams, was cooled to 20° C. The precipitated crystals were filtered and recrystallized twice from 50 cc. acetone obtain nine grams of ditrimethylolpropane having a melting point of 108–109° C.

EXAMPLE 3

Two hundred and sixteen grams of n-butyraldehyde and 136 g. of calcium hydroxide (90% purity) were added dropwise simultaneously and gradually to 2840 g. of 10% aqueous solution of formaldehyde with thorough stirring. The reaction temperature was maintained at 25° C. by external cooling. The time required for the addition of n-butyraldehyde and calcium hydroxide was 8 hours. After further stirring at 25° C. for one hour, the reaction mixture was neutralized to pH 6.8 with the addition of formic acid, and was concentrated under vacuum until the most part of water was distilled away. After the precipitated calcium formate was separated off by filtration while hot (70° C.), the crude trimethylolpropane was distilled at 150–155° C. under a vacuum of 3 mm. Hg. By this procedure, there remained 45 g. of bottom residue in the still pot. The pot was then heated to 200° C. and superheated steam (210° C.) was introduced therein for 1 hour, while maintaining a vacuum on the system of 50 mm. Hg, to obtain 200 g. of distillate. The distillate was concentrated to dryness to give 12 g. of product consisting mainly of ditrimethylolpropane and useful as an industrial material. Recrystallization of acetone (40 cc.) was repeated three times to obtain 6 g. of pure ditrimethylolpropane having a melting point of 108–109° C.

What we claim is:

1. A process for recovering ditrimethylolpropane from the bottom residue obtained in the production of trimethylolpropane from n-butyraldehyde and formaldehyde in the presence of an alkaline catalyst, which comprises subjecting the bottom residue remaining after vacuum distilling the trimethylolpropane from the resulting reaction mixture to steam distillation with superheated steam at a pressure less than atmospheric pressure to obtain a distillate containing ditrimethylolpropane, and then concentrating and cooling the distillate to precipitate the ditrimethylolpropane therefrom.

2. A process for recovering ditrimethylolpropane from the bottom residue obtained in the production of trimethylolpropane from n-butyraldehyde and formaldehyde in the presence of an alkaline catalyst, which comprises subjecting the bottom residue remaining after vacuum distilling the trimethylolpropane from the resulting reaction mixture to steam distillation with superheated steam at a pressure less than atmospheric pressure to obtain a distillate containing ditrimethylolpropane, removing water from the distillate to obtain ditrimethylolpropane and then recrystallizing the ditrimethylolpropane from water or an organic solvent.

3. A process according to claim 2 wherein the ditrimethylolpropane is recrystallized from acetone.

References Cited

UNITED STATES PATENTS

| | | | |
|---|---|---|---|
| 3,097,245 | 7/1963 | Russell et al. | 260—615 R |
| 2,292,926 | 8/1942 | Brubaker et al. | 260—637 P |
| 3,379,624 | 4/1968 | Lindkvist | 260—637 P |
| 3,259,662 | 7/1966 | Munley, Jr. | 260—637 P |
| 3,037,060 | 5/1962 | Dege | 260—637 P |
| 2,820,066 | 1/1958 | Taylor | 260—615 R |

FOREIGN PATENTS

| | | |
|---|---|---|
| 816,208 | 7/1959 | Great Britain. |
| 816,209 | 7/1959 | Great Britain. |
| 1,052,383 | 3/1959 | Germany. |

WILBUR L. BASCOMB, JR., Primary Examiner

U.S. Cl. X.R.

203—80, 92, 79; 260—616, 637 P